United States Patent [19]

Boettcher

[11] 3,975,226

[45] Aug. 17, 1976

[54] APPARATUS FOR DRY PRINTING ON CONTOURED WORKPIECES

[75] Inventor: Carl E. Boettcher, Evansville, Ind.

[73] Assignee: Automatic Industrial Machines, Inc., Evansville, Ind.

[22] Filed: May 12, 1975

[21] Appl. No.: 576,890

[52] U.S. Cl. .............................. 156/358; 156/359; 156/360; 156/361; 156/486; 156/495; 156/542

[51] Int. Cl.$^2$ .............................. B32B 1/10

[58] Field of Search .......... 156/358, 359, 360, 361, 156/540, 541, 542, 459, 468, 475, 486, 492, 495

[56] References Cited

UNITED STATES PATENTS

| | | | |
|---|---|---|---|
| 2,939,599 | 6/1960 | Schulter | 156/361 |
| 3,039,516 | 6/1962 | Vinal | 156/361 |
| 3,427,214 | 2/1969 | Voigt | 156/361 |
| 3,434,902 | 3/1969 | Bliss | 156/542 X |
| 3,810,805 | 5/1974 | Goldsworthy et al. | 156/361 |
| 3,861,986 | 1/1975 | Wochner | 156/542 |

*Primary Examiner*—William A. Powell
*Assistant Examiner*—Thomas Bokan
*Attorney, Agent, or Firm*—Wood, Herron & Evans

[57] ABSTRACT

Means for dry printing from a foil onto a workpiece having a contoured (inclined) surface. As the workpiece is advanced linearly beneath a foil applicator roll, an inclined surface on the workpiece will shift the roll in a vertical direction relative to a carriage, from which the roll is biased downwardly. Such roll movement is sensed and causes a force to be applied to the carriage, to move the carriage in a vertical direction so that it "follows" the roll. The carriage movement is limited to an amount sufficient that a pre-established downward biasing force on the roll will be restored, so that the roll pressure on the foil is maintained within an effective printing range. Further, a driving force is applied to the roll and foil that tends to move them faster than the rate at which the workpiece is being advanced. This driving force is resisted by the frictional engagement of the roll against the workpiece, so that the actual foil speed will match the actual surface velocity of the workpiece at the point of roll contact.

8 Claims, 5 Drawing Figures

APPARATUS FOR DRY PRINTING ON CONTOURED WORKPIECES

BACKGROUND OF THE INVENTION

This invention relates to a method and apparatus for dry printing onto a workpiece having a contoured surface.

Dry printing is a decorating technique whereby a design is transferred from a flexible dry carrier, or "foil," onto a part that is to be decorated. The technique is widely used to apply decorative media to product surfaces such as instrument panels, name plates, dashboards, T.V., radio and other appliance cabinets, and so on. In its simple form, the foil (on which the design is carried prior to transfer) has four layers: a base web, which may be cellophane, paper, acetate, mylar or other film, usually in continuous strip form; a release layer such as wax or a resin, meltable when heat is applied to the uncoated side of the web; a decorative coating or print layer which is a combination of pigment and binder such as shellac; and a heat and pressure sensitive sizing or adhesive material formulated to adhere to the particular surface to be decorated.

In the "hot stamping" method of dry printing, the foil is positioned over the workpiece surface to be decorated and a heated die presses an area of the foil against the surface. Heat transfers from the die to the foil, causing the release layer to melt, thereby releasing the decorative layer from the base web, and activating the adhesive on the opposite side of the print layer so that the print layer adheres to the article when the web is removed.

The invention relates to the so-called "roll on" type of dry printing process, wherein the foil is engaged with the workpiece by a roller, as the workpiece is passed beneath the roll, rather than stamped by a die. A further background description of dry printing techniques is given in *Appliance Manufacturer*, August 1973.

In each method, the release of the printing layer from the foil and its transfer and adhesion to the workpiece requires the application of pre-established conditions of heat, pressure and dwell time.

The hot stamping method can be used to apply designs to angulated surfaces, and to surfaces which are curved or contoured, by use of a die which is contoured to match the surface to be decorated. That technique requires, of course, a separate die for each particular type of contoured surface to be decorated. Moreover, it requires some accuracy in the alignment of the workpiece with respect to the die, so that the die will properly engage the workpiece. The hot stamping method suffers from the defect that occasionally bubbles of air are trapped between the design layer and the workpiece surface, especially where a design is being applied over a large area at one time.

The roll-on method does not generally require specially shaped rolls, and it substantially obviates the difficulty of bubble entrapment. However, roll-on techniques have been limited to use with surfaces which are essentially horizontally oriented, i.e., uncontoured (in the direction of workpiece movement relative to the roll). Previous roll-on presses have not been able to provide or maintain the needed constancy of heat, pressure and dwell time on contoured surfaces. Workpiece surfaces having a substantial contour have, therefore, required hot stamping.

Previous roll-on type dry printing machines have included a conveyor which advances the part to be printed beneath the roller, which is mounted above the conveyor in a carriage. The roll is heated by radiation from heating elements in a semi-circular hood above the roll. The foil is fed beneath the roll, rotation of the roll conveying heat from the heating element to the foil. The carriage which carries the roll is adjustable vertically, to enable the roll height to be set to match the size of a given workpiece. The roll is biased downwardly, toward the workpiece, by spring pressure, but the useful range of vertical travel has been limited to a fraction of an inch because bias spring forces change too rapidly over greater distances and therefore do not maintain the application pressure within an acceptable range. The limited roller travel has thus been sufficient to accommodate only minor contouring such as the surface irregularities normal to manufacturing processes.

The foregoing limitations of the roll travel range, within which there is acceptable constancy of roll-on force, have prevented use of roll-on processes for applying dry print designs onto surfaces having a high degree of contouring, such as around a curved corner from one surface onto an adjacent surface. Thus, it has not been possible, in a single pass, to decorate, for example, an automobile grille having two surfaces which meet at an angle at the center. In the past such contoured surfaces have had to be decorated in sequential steps by a hot stamping process with a die corresponding to the contour of each distinct surface area, or by mounting the part so that each surface is presented horizontally for roll-on decoration.

DETAILED DESCRIPTION OF THE INVENTION

Figure 1:
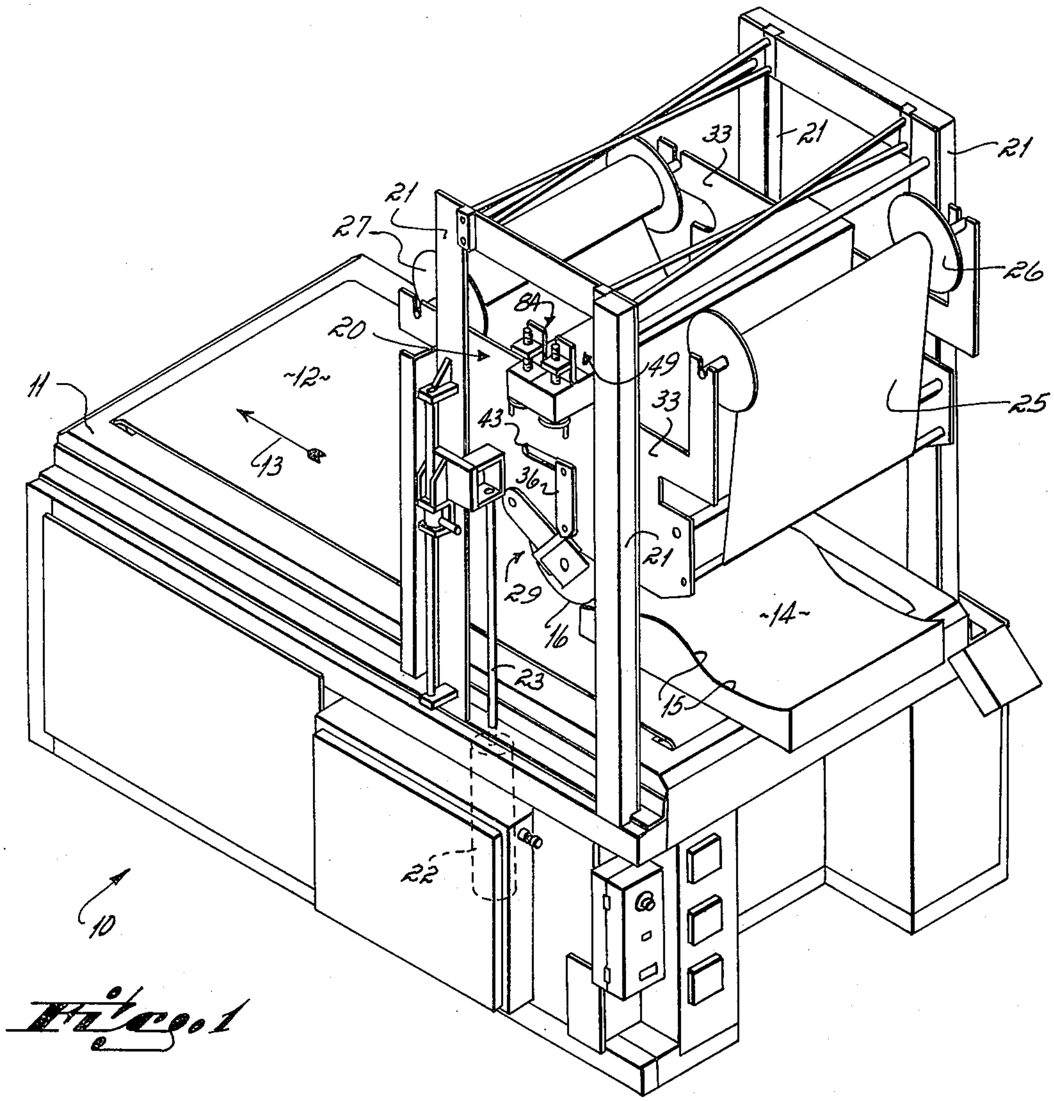

In accordance with the method aspect of this invention, the dry printing foil is rolled onto the moving workpiece by an applicator roll which is yieldably biased toward the workpiece surface. An inclined surface of the workpiece increases the upward force on the roll, and moves the roll vertically against the biasing force. Such vertical movement of the roll is sensed, and the sensed movement is applied to change the biasing force by an amount which will effectively restore the pre-existing biasing force. The foil is moved at a speed which matches the actual workpiece surface velocity, at the point where the roller is contacting the workpiece.

In accordance with the apparatus aspect of the invention, the press includes a carriage which is mounted for vertical movement with respect to a frame. The roll is mounted to the carriage for vertical movement relative to the carriage. Means are provided for rotating the roll and for advancing a strip of dry printing foil beneath the roll. A conveyor or other means advances the workpiece beneath the foil and roll, and a spring biases the roll downwardly relative to the carriage, toward engagement with the workpiece surface. Carriage moving means are operable to move the carriage vertically relative to the frame. Vertical movement of the roll relative to the carriage is sensed by a sensing means, and this movement is applied through a servomechanism to operate the carriage moving means so that the carriage is moved vertically, to follow the vertical movement of the roll relative to the carriage, by an amount sufficient to maintain an effectively constant downward bias of the spring on the roll.

According to the preferred embodiment of the invention, the roll is suspended by a toggle linkage at each end, from a fixed cross member of the carriage. The cross member extends parallel to the roll and the roll is spring biased downwardly from the cross member. Means are provided for pivoting the roll about an axis parallel to the direction of workpiece movement, and the pivot axle is shiftable vertically with respect to the carriage.

An important aspect of the invention comprises means for permitting the foil speed to follow exactly the apparent surface velocity of the workpiece, which will vary according to the contour angulation. An inclined surface on a workpiece which is being advanced by a belt moving at a constant speed, will have an increased apparent surface velocity, relative to the conveyor speed, since the surface velocity of the roll at the point of workpiece contact will then reflect a vertical component of movement summed with the constant horizontal component of movement. The roll and foil speed must match the apparent surface speed closely, else the print will blur or wrinkle in transfer; moreover, this speed will change as surface areas of different contour are advanced beneath the roll.

The invention provides means for accommodating such differences and changing differences in surface speed relative to workpiece motion. This is done by means which tends to drive the roll and foil at a speed in excess of the rate of linear advancement of the workpiece. The foil drive includes slip means, which permits the foil and roll to be slowed by surface engagement of the foil with the workpiece, to match the actual surface speed of the local surface contour where the roller is engaged with it.

Figure 5:
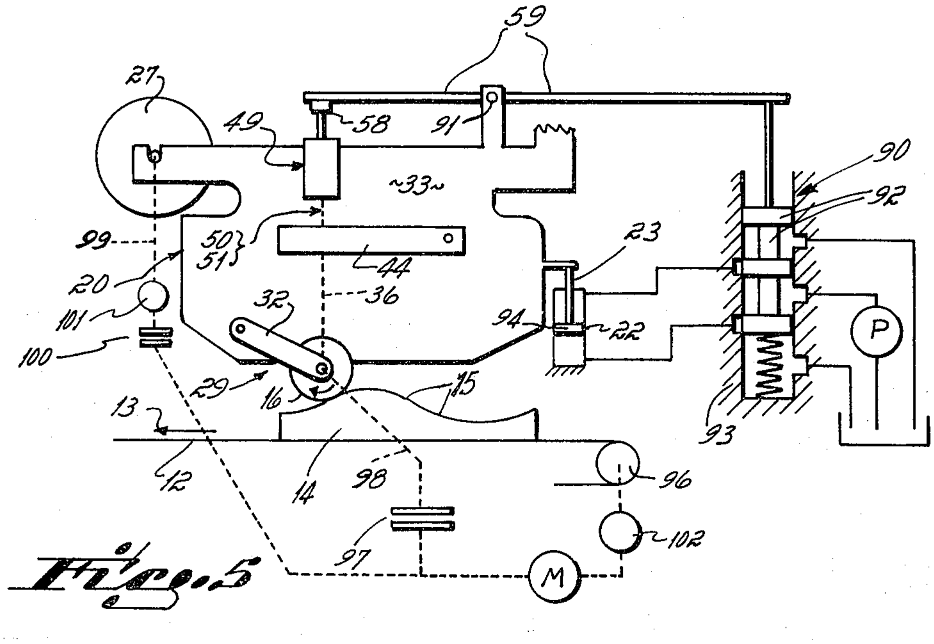
Figure 2:
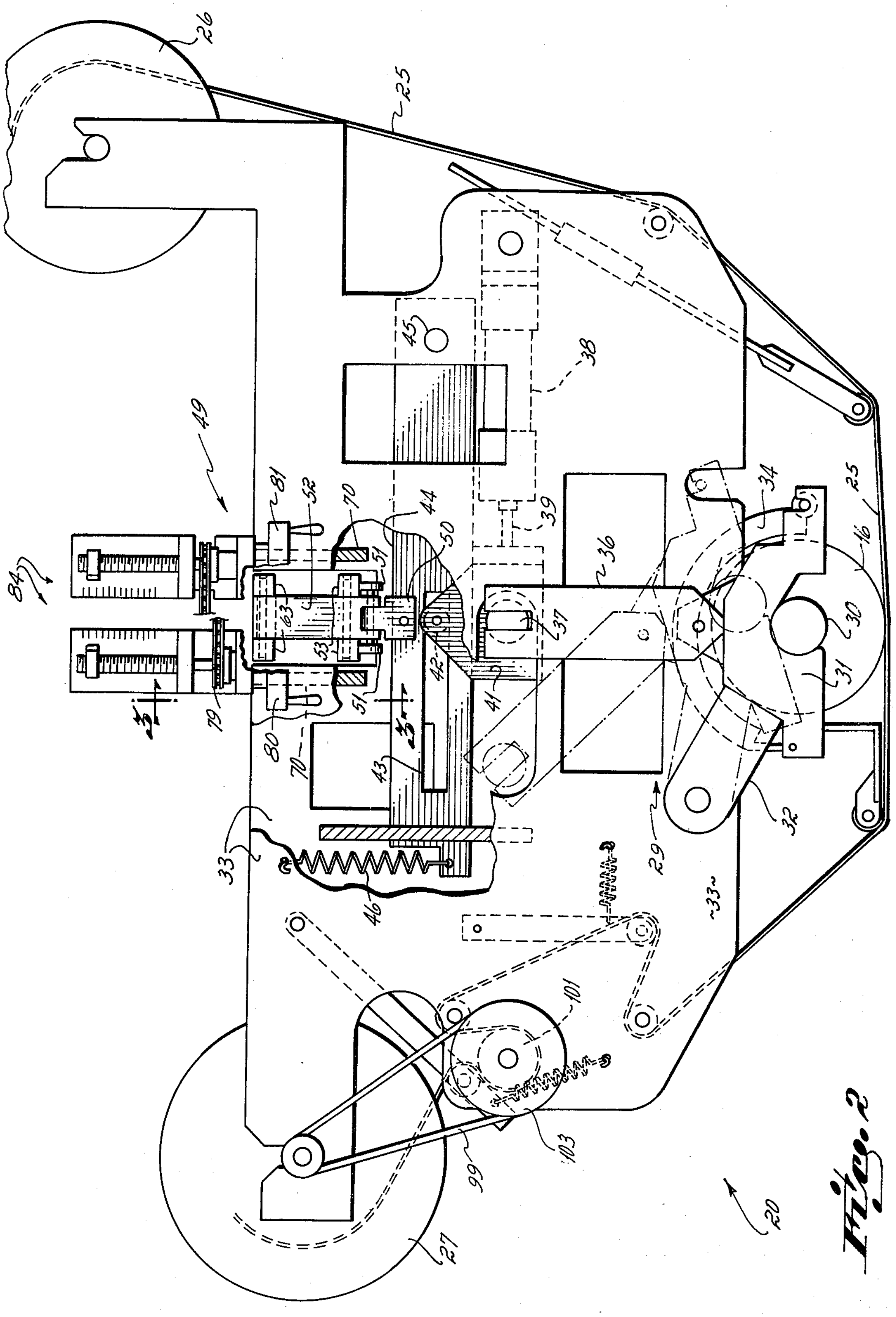
Figure 4:
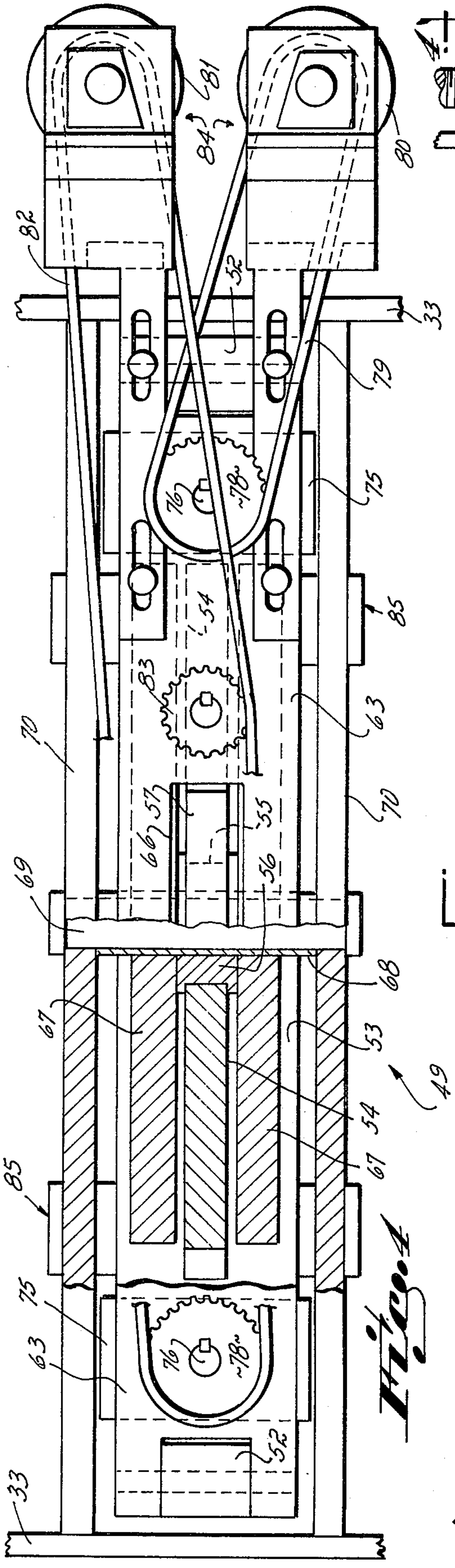
Figure 3:
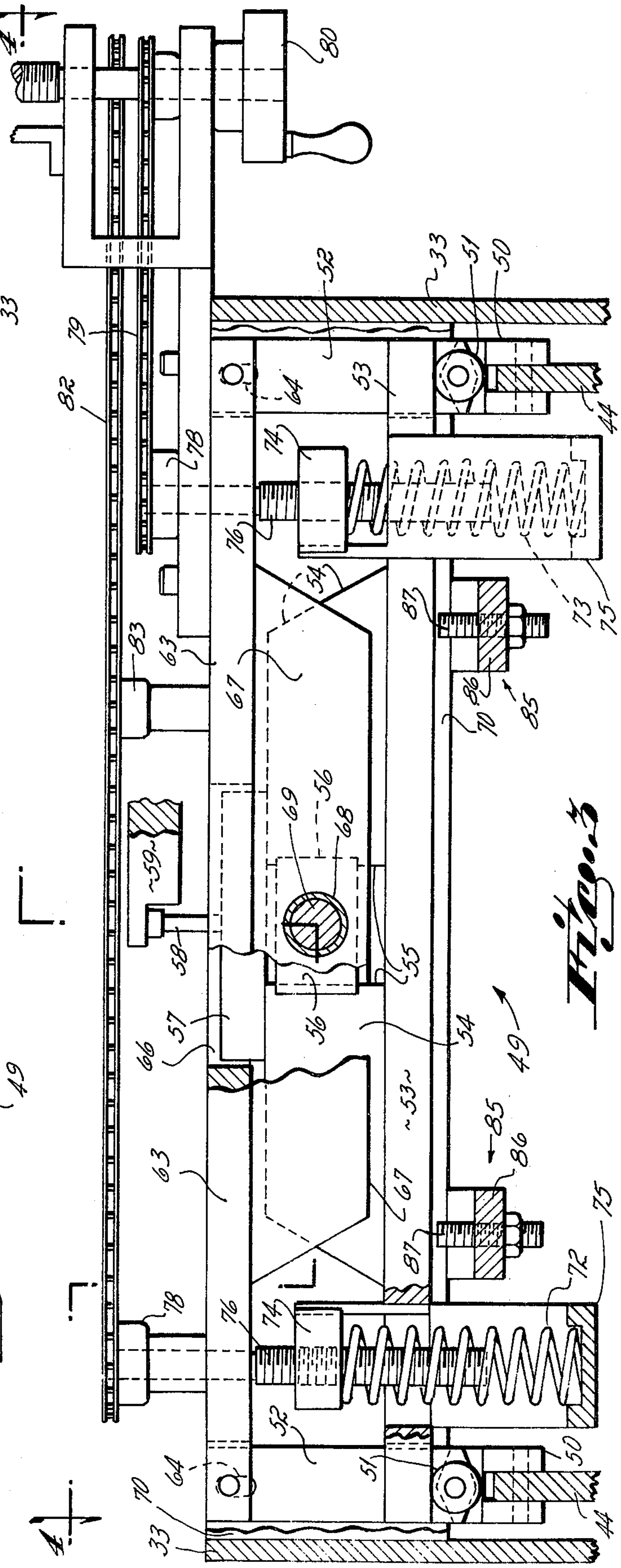

The invention can best be further described and its advantages pointed out by reference to the accompanying drawings in which, FIG. 1 is a perspective view of a preferred form of dry printing apparatus in accordance with the invention and useful for carrying out the method of the invention, FIG. 2 is a side elevation, partly broken away, of the carriage of the apparatus shown in FIG. 1, FIG. 3 is an enlarged vertical cross section, taken on line 3—3 in FIG. 2, FIG. 4 is a horizontal section taken on line 4—4 of FIG. 3, and FIG. 5 is a diagrammatic illustration showing the roll, foil, and belt drives, and the servomechanism for operating the carriage moving means.

The roll-on press for dry printing designated generally by 10 in FIG. 1 includes a frame or bed 11 over which a workpiece advancing means, here in the form of a belt conveyor 12, is movable. In use belt 12 advances in the direction of arrow 13. (The details of the belt drive may be conventional and are not shown.) A workpiece 14, having a contoured surface 15 to be decorated, is carried by the belt conveyor 12 beneath an applicator roll 16.

Roll 16 is mounted to a carriage generally at 20. The carriage is vertically movable with respect to frame 11, being slidable along vertical columns 21, there being two columns on each side of the carriage in the embodiment shown. Carriage moving means, for changing the vertical position of carriage 20 on columns 21 to accommodate workpieces 14 of different sizes, are preferably in the form of a hydraulic cylinder as designated at 22. Cylinder 22 operates a piston rod 23 which is connected to carriage 20 to shift it in the vertical direction. (In order to prevent "cocking" of the carriage with respect to the columns 21 on which it slides, it is useful to provide lifting cylinders 22 on both sides of the carriage, and to provide linkages such that all lifting cylinders move in equal increments.)

Dry printing foil 25 is supplied from a feed reel 26 and is guided to pass beneath applicator roll 16, and is threaded over tensioning rolls to a driven take-up reel 27 (see FIG. 2).

Roll 16 being carried by carriage 20, it can move vertically as the carriage is moved. Additionally, however, the roll is also movable vertically relative to the carriage, and it is spring biased downwardly with respect to the carriage.

In the preferred form of the invention, the roll mounting means designated generally at 29 (shown in greater detail in FIG. 2) mount the roll on the carriage for relative vertical movement. Both sides of the carriage are essentially similar. Roll 16 turns on a roll axle 30 which is journaled at each end in a roll end bracket 31. A roll swing arm 32 projects from the bracket 31, and at an opposite end swing arm 32 is pivotally secured to a carriage side plate 33. A conventional roll heater 34 (shown in dashed lines), of a type known per se, is mounted between the end brackets 31 and positioned above the roll, so that it moves up and down with the roll. The heater applies radiant heat to the adjacent surface of the roll and, as the roll turns, this heat is transferred to the foil 25 beneath the roll. The roll is kept rotating while the heater is on, to prevent excessive localized heating, by the roll drive mechanism to be described.

A roll lift arm 36 is pivotally connected to the roll end bracket 31 at a lower end, and at its upper end is secured to a cross bar 37. The cross bar is shiftable in the longitudinal direction (i.e., the direction parallel to arrow 13 in FIG. 1) by the rod 39 of a fluid pressure cylinder 38 which is pivotally mounted on a shaft between the carriage side plates 33. For printing, roll axle 30, lift arm 36 and cross bar 37 are held by cylinder 38 in vertical alignment, in the "roll down" configuration indicated by the solid lines in FIG. 2. In this configuration the roll engages the foil so as to transfer to it the heat required for printing. When pressure fluid is applied to extend piston rod 39, bar 37 is moved leftward, which moves the upper end of the lift arm with it, thereby lifting the roll on swing arm 32 to the "roll up" or "no print" configuration indicated by the dashed lines. In this position the roll is disengaged from the foil, so that no heat is transferred to it, and the foil need not be advanced.

In the "roll down" configuration, direct downward force can be transmitted through arm 36, which is then in the vertical position, to axle 30, and the only force that need be applied by the (horizontal) piston 38 is the relatively small force necessary to keep the arms 36 in vertical position. It will be apparent that a vertically mounted cylinder could be used to apply direct downward pressure to the roll, however, such a cylinder would have to be of much larger size; whereas the preferred use of a toggle joint enables a relatively small cylinder, located horizontally, to control the vertical position of a roller on which a large force acts in operation.

A slide plate 41 is connected at the end of cross bar 37. This slide plate 41 has a roller 42 mounted to its upper end, which roller slides in a slot 43 in a lever 44 pivoted at 45 to the carriage side plate 33. The slot 43 accommodates the horizontal travel of slide plate 41 when piston rod 39 is extended to lift the roll. A bias spring 46 urges lever 44 upwardly about its pivot 45. As will be explained, this lever 44 and cylinder 38 are moved about their pivots when roll 16 is shifted vertically with respect to the carriage side plate 33, the vertical movement being imparted to lever 44 from roll end bracket 31 through roll lift arm 36, slide plate 41 and roller 42.

Roll biasing means designated generally by 49 (best seen in FIGS. 2 and 3) are provided to exert a resilient biasing force on the roll, tending to move it downwardly relative to the carriage. Provision is also made for the roll to pivot about an axis parallel to arrow 13, to accommodate minor sidewise surface irregularities or unevenness in the part to be decorated.

A kind of universal joint is provided between the lever 44 and the roll biasing means 49, to accommodate the relative movement. This includes a swingable bracket 50 which is pivotally secured to lever 44 (see FIG. 3). Bracket 50 is also pivotally connected to an upright post 52, for rotation about an axis in the longitudinal direction. Rollers 51 are mounted to bracket 50 outboard of the pivotal connection to post 52. The rollers 51 engage and support the undersurface of a movable lower cross member 53. This lower cross member 53 extends across the width of the conveyor and is slotted at its outer ends to receive post 52 (see FIGS. 3 and 4).

Lower cross member 53 mounts two spaced apart pivot guides 54, 54 (see FIG. 3) which define a slotlike opening 55 between them. A pivot slide 56 is captured between the guides 54, 54 in opening 55 (see FIG. 4) and is slidable vertically therein. A block 57 is mounted atop the pivot guides 54, 54, and this block has an adjustable finger or stop 58 which projects upwardly from it. This stop 58 acts upon a sensor or arm 59 which is a part of means for sensing vertical movement of the roll relative to the carriage, to be described.

A fixed upper cross member 63 extends parallel to and above movable lower cross member 53. The upper ends of the upright posts 52, 52 are loosely pinned in vertical slots 64 at the outer ends of member 63. Block 57 projects through a central opening 66 in upper cross member 63. The pivot guides 54, 54, which project upwardly from the lower cross member 53, are flanked on the front and back by upper pivot guides 67, 67, which are mounted to and project downwardly from the upper cross member 63. The upper pivot guides 67, 67, as well as the pivot slide 56 are bored centrally to receive a tubular bushing 68 which carries an axle 69, the ends of which are journaled in cross beams 70, 70, that are secured between the carriage side plates 33, 33.

The downward biasing of roll 16 with respect to the carriage is accomplished through means in the form of springs 72, 73 (see FIG. 3) adjacent the respective levers 44, 44. The springs are seated in cages 75 secured to the movable lower cross member 53. At their upper ends, the respective springs are engaged and compressed by adjusting nuts 74 on screws 76. The nuts slide vertically on keys projecting above the cages 75. From FIG. 3 it can be seen that rotation of either screw 76 changes the vertical position of the respective nut 74 thereon, and thereby changes the preload on the corresponding spring 72 or 73. This admits of different preloads on opposite ends of the roll, to accommodate nonsymmetrical workpieces.

The preloading of the respective springs is controlled by individual adjusting cranks. Each screw 76 has a sprocket 78 at its upper end. The sprocket of the right hand screw (as viewed in FIGS. 3 and 4) is turned by a chain 79 operated by a crank 80, positioned outboard of carriage 33. A separate crank 81 turns a chain 82 which passes around an idler 83 (for clearance around sensor arm 59) and operates to turn the left sprocket 78. As shown in FIG. 2, the cranks 80, 81 may be provided with indicators as at 84 to provide a relative reading of the precompression of the springs.

The preferred mechanism shown provides not only for relative vertical movement of the roll with respect to the carriage, but also for pivoting movement. This can be seen by reference to FIG. 3. Assuming that an upward force acts on right lever arm 44 (for example, as from a workpiece which is slightly higher at that side), torque is applied through roller 51 to the lower cross member 53, causing pivot slide 56 to turn about pivot axle 69. The pivoting motion is not necessarily accompanied (although it may be) by vertical movement of the lower cross member 53. The amount of pivoting movement is limited to relatively small amounts, up to roughly 2° on either side of horizontal, because of mechanical constraints. The maximum amount of pivoting movement can be limited by pivot limit stops generally at 85, 85. These stops include brackets 86 mounted from and beneath the cross beams 70, 70. Limit screws 87 project upwardly from the brackets 85, and as the movable lower cross member 53 is tilted, one of the screws will abut the lower surface of the cross member at the limiting position. The limit stops may be set so as to permit no pivot movement, if desired.

When the roll engages a workpiece surface that is inclined (in the longitudinal direction) from an initial or starting point, the inclined surface tends to lift the roll upwardly against the spring bias. The upward roll movement is transmitted through the roll lift arm 36 to roller 42, which turns lever 44. Upward movement of this lever is transferred through bracket 50 and rollers 51, 51 to lower cross member 53. This tends to increase the load on springs 72 and 73. Unless this additional spring load is compensated for, it could result in improper foil application. The upward movement shifts pivot guides 54, 54 upward, so that they slide relative to the pivot slide 56 and axle 69. This upward movement shifts the finger 58 upwardly, and this movement is sensed by the sensing feeler 59, which is mounted on the carriage as at 91 (see FIG. 5). This sensed movement is applied, by means to be described, to lift the entire carriage upwardly on the support columns 21 a distance which maintains the load on roll 16 within the range needed for effective application of the foil.

A preferred type of system for moving the carriage to follow small incremental movements of the roll, thereby to adjust the biasing force to maintain it effectively constant, is shown in FIG. 5. In this system, means for sensing vertical movement of the roll relative to the carriage is provided in the form of arm 59, pivotally mounted on the carriage at 91. Arm 59 is connected to operate a valve, designated at 90, which controls operation of the carriage moving means to move the carriage to follow the vertical movement of the roll relative to the carriage. Specifically, valve 90 controls the application of fluid pressure from a pump P to cylinder 22 which controls the vertical position of the carriage on the columns 21. Upward movement of finger 58 with respect to carriage side plate 33 turns sensor arm 59 in the clockwise direction about its pivot point 91, thereby shifting the spool 92 of valve 90 downwardly with respect to the valve body 93. This opens a path from the pump P through valve 90 and fluid pressure is applied to the lower face of the piston 94 of cylinder 22. Simultaneously, the chamber above piston 94 is vented, and rod 23 is operated to shift the carriage upwardly. Upward movement of the carriage raises arm 59, with respect to the body of valve 90, thereby gradually restoring spool 92 to the null or centered position. As the carriage moves upward, the roll is moved down relative to it by the biasing springs, so that the spring force is maintained in an effective printing level and does not become excessive. When the roll engages a workpiece of opposite contour, i.e., a downward inclination, the operation is reversed. By suitable positioning of finger 58, the system will follow very small roll movements accurately, so that the bias force will remain within its effective limits, through the surface may be highly contoured. It will be apparent from the foregoing that other feed back means or linkages, including solenoids or transducers, may be used to sense the incremental movement of the roll and to operate the carriage moving means in response.

As pointed out previously, the speed of the foil must match that of the workpiece surface to which the print layer is being transferred. Speed differences cause defects in the applied design. When the foil is being applied to a surface which is horizontal, the surface velocity of the foil (and the surface velocity of the roll) should match the forward speed of belt 12. However, when the roll engages a workpiece with a surface that is inclined from horizontal (either upwardly or downwardly) the roll and foil must move more rapidly along the angulated surface, because a vertical component of motion has been added vectorially to the belt's horizontal motion.

An important aspect of the invention concerns the provision of means for matching foil speed to the actual surface speed of a contoured surface, which differs from belt speed. For this purpose, an input torque is applied to the foil drive and to roller 16, which tends to move them faster than the forward velocity of belt 12. This torque is resisted by the frictional engagement of the foil with the workpiece surface, and the resultant actual foil speed matches the surface speed where the foil is being rolled against the surface, whether the surface is inclined or horizontal. This is preferably accomplished by a system which includes means for advancing roll 16 in the form of a motor M (see FIG. 5) that is connected through a friction clutch 97 and a belt or other coupling indicated diagrammatically at 98, to turn the roll. Motor M also drives a foil advancing roll 101 through a clutch 100. Clutch 100 is desirably solenoid operated, so that the foil can be advanced selectively when roll 16 is in the roll-down or "print" position. (Roll 16 desirably is rotated at all times when the heater is on, so that the temperature is uniform over its surface.) Foil advancing roll 101 in turn drives the foil take-up reel 27 at a more rapid rate, through a belt 99 which is turned by a large diameter sleeve 103 on the end of roll 101 (see FIG. 2). The provision of belt 99 permits the rate of rotation of the take-up reel 27 to change, relative to roll 101, by belt slip as the diameter of the roll of foil backing increases a reel 27. The same or a different motor drives conveyor 12, at a rate slower than roll 16 and the foil, for example through a speed reducer 102. From this it can be seen that, although the foil and the applicator roll 16 tend to move faster than conveyor 12, their actual speeds are matched by slip in clutches 97 and 100, with the speed of the article contour at the line of contact.

Apart from the differences in foil speed that result from workpiece contour changes, the force exerted by the applicator roll on the foil will also change with contour changes. This force, that is, the reaction force exerted by the workpiece against the downward forces of the spring and gravity on the applicator roll, will differ from the vertical forces except when the workpiece surface is horizontal. This difference results from the fact that the point of contact between the applicator roll and the workpiece does not then lie on the vertical line through the roll axis, but rather as angulated and the reaction force includes a non-vertical component, which sums vectorially with the reaction force (directed perpendicularly to the workpiece contour at the point of contact) to produce a resultant which is equal and opposite to the downward forces. Moreover, this reaction force depends not only upon the contour inclination, but also upon the angulation, with respect to horizontal, of the imaginary line between the center of the roll axle and the roll swing arm pivot point. A further difference between the vertical downward force on the roll, and the reaction force normal to the workpiece contour, arises because the frictional forces in the roll mounting are additive to, or subtractive from, the spring force and gravity, depending on whether the roll is moving up (i.e., is on an inclined surface) or down. These factors can be minimized for a given workpiece contour, so that suitably uniform foil application pressure is achieved, by adjustment or preselection of the angulation of the line connecting the roll center and the roll arm pivot point. This can be done by changing the point about which roll arm 32 pivots on the carriage. It should also be understood that it is not necessary that the applicator roll be mounted on pivot arms; for example the roll may be mounted on slides for vertical movement. If such slides are mounted on vertical ways, the reaction forces would be similar to those on a roll with a horizontal pivot arm mounting, neglecting frictional effects.

While the invention has been described herein in terms of a preferred embodiment, those skilled in the art will recognize that the invention can be employed in other specific structures, within the scope and spirit of the following claims.

What is claimed is:

1. Dry printing apparatus for roll-on print transfer from a foil onto a contoured surface of a workpiece, comprising, a carriage mounted for vertical movement with respect to a frame, a roll and means for rotating it, roll mounting means on said carriage mounting the roll for vertical movement relative to the carriage, means for advancing a strip of dry printing foil below the roll, means for advancing a workpiece under said foil, spring means biasing the roll downward relative to the carriage, carriage moving means for moving the carriage vertically relative to the frame, sensing means for sensing vertical movement of the roll relative to the carriage, and means actuated by the sensing means to operate the carriage moving means so that the carriage is moved vertically relative to the frame, corresponding to the vertical movement of the roll relative to the carriage, so as to restore substantially the same downward bias of said spring means on the roll.

2. The dry printing apparatus of claim 1 wherein, the means for advancing the foil applies a torque which urges the foil to move at a surface speed faster than the rate at which the workpiece advancing means moves the workpiece, and wherein the said means for advancing the foil includes means which permits the foil to slow to the surface velocity of said workpiece when engaged with a workpiece by said roll.

3. The dry printing apparatus of claim 2 wherein said foil and roll are driven by a motor through a slip clutch.

4. The dry printing apparatus of claim 1 wherein said carriage is mounted for sliding movement on a plurality of vertical columns extending upwardly from said frame, piston means are provided for vertically moving said carriage along said columns, and said sensing means actuates a valve regulating the application of pressure fluid to said piston means.

5. The dry printing apparatus of claim 1 further wherein said roll is pivotally mounted to said carriage, for limited pivotal movement about an axis parallel to the direction of movement of the workpiece.

6. The dry printing apparatus of claim 1 further wherein said roll is suspended from a cross member mounted by the carriage, the cross member extending parallel to the roll, the roll being spring biased downwardly from the cross member.

7. The dry printing apparatus of claim 1 further wherein said roll is mounted to said cross member through a pivot axle, and wherein the said pivot axle is shiftable vertically with respect to said carriage.

8. The dry printing apparatus of claim 1 wherein said roll is mounted to said carriage by a toggle joint having a swingable lift arm, and wherein fluid pressure operated means is connected to move said arm toward a vertical position and thereby to move said roll relative to said carriage.

* * * * *